United States Patent
Knowles et al.

(10) Patent No.: US 7,395,971 B2
(45) Date of Patent: Jul. 8, 2008

(54) METHOD OF AND SYSTEM FOR PROFILE EQUALIZATION EMPLOYING VISIBLE LASER DIODE (VLD) DISPLACEMENT

(75) Inventors: C. Harry Knowles, Moorestown, NJ (US); Michael Schnee, Aston, PA (US); Xiaoxun Zhu, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 247 days.

(21) Appl. No.: 11/219,382

(22) Filed: Sep. 2, 2005

(65) Prior Publication Data

US 2006/0000909 A1    Jan. 5, 2006

Related U.S. Application Data

(63) Continuation-in-part of application No. 10/639,362, filed on Aug. 12, 2003, now Pat. No. 7,143,943, which is a continuation of application No. 09/780,027, filed on Feb. 9, 2001, now Pat. No. 6,629,641, which is a continuation-in-part of application No. 09/721,885, filed on Nov. 24, 2000, now Pat. No. 6,631,842.

(60) Provisional application No. 60/678,884, filed on May 6, 2005.

(51) Int. Cl.
*G02B 5/00* (2006.01)

(52) U.S. Cl. ............................ 235/462.32; 235/462.22; 235/462.42

(58) Field of Classification Search ............ 235/462.32, 235/462.22, 462.23, 462.25, 462.42
See application file for complete search history.

(56) References Cited

U.S. PATENT DOCUMENTS

| 5,193,899 A | 3/1993 | Oe .............................. 362/223 |
| 5,319,181 A | 6/1994 | Shellhammer .............. 235/462 |
| 5,319,185 A | 6/1994 | Obata .......................... 235/462 |
| 5,378,883 A | 1/1995 | Batterman ............. 235/462.21 |
| 5,408,388 A | 4/1995 | Kobayashi .................... 362/26 |
| 5,484,994 A | 1/1996 | Roustaei ..................... 235/464 |

(Continued)

*Primary Examiner*—Ahshik Kim

(57) ABSTRACT

A method of equalizing the illumination produced by a planar laser illumination array within a planar laser illumination and (electronic) imaging system, comprising the steps of: providing an image formation and detection module having imaging optics with a field of view (FOV) focused upon an image detecting array; providing a planar laser illumination array having a plurality of planar laser illumination modules, each planar laser illumination module producing a planar laser beam component during image formation and detection operations, which are combined to produce a composite planar laser illumination beam extending through a working range of said FOV, wherein said working range includes both near and far fields, if the near field illumination is brighter then the far field illumination: displacing a first portion of the planar illumination modules in a first direction perpendicular to said FOV and a second portion of the planar illumination modules in a second direction opposite to said first direction, angling each planar laser illumination beam component to overlap at said far field, whereby the power density incident on the near field is reduced; and if the far field illumination is brighter then the near field illumination: displacing a first portion of the planar illumination modules in a first direction perpendicular to the FOV and a second portion of the planar illumination modules in a second direction opposite to said first direction, angling each planar laser illumination beam component to overlap at the near field, whereby the power density incident on the far field is reduced.

18 Claims, 17 Drawing Sheets

U.S. PATENT DOCUMENTS

Figure 2:
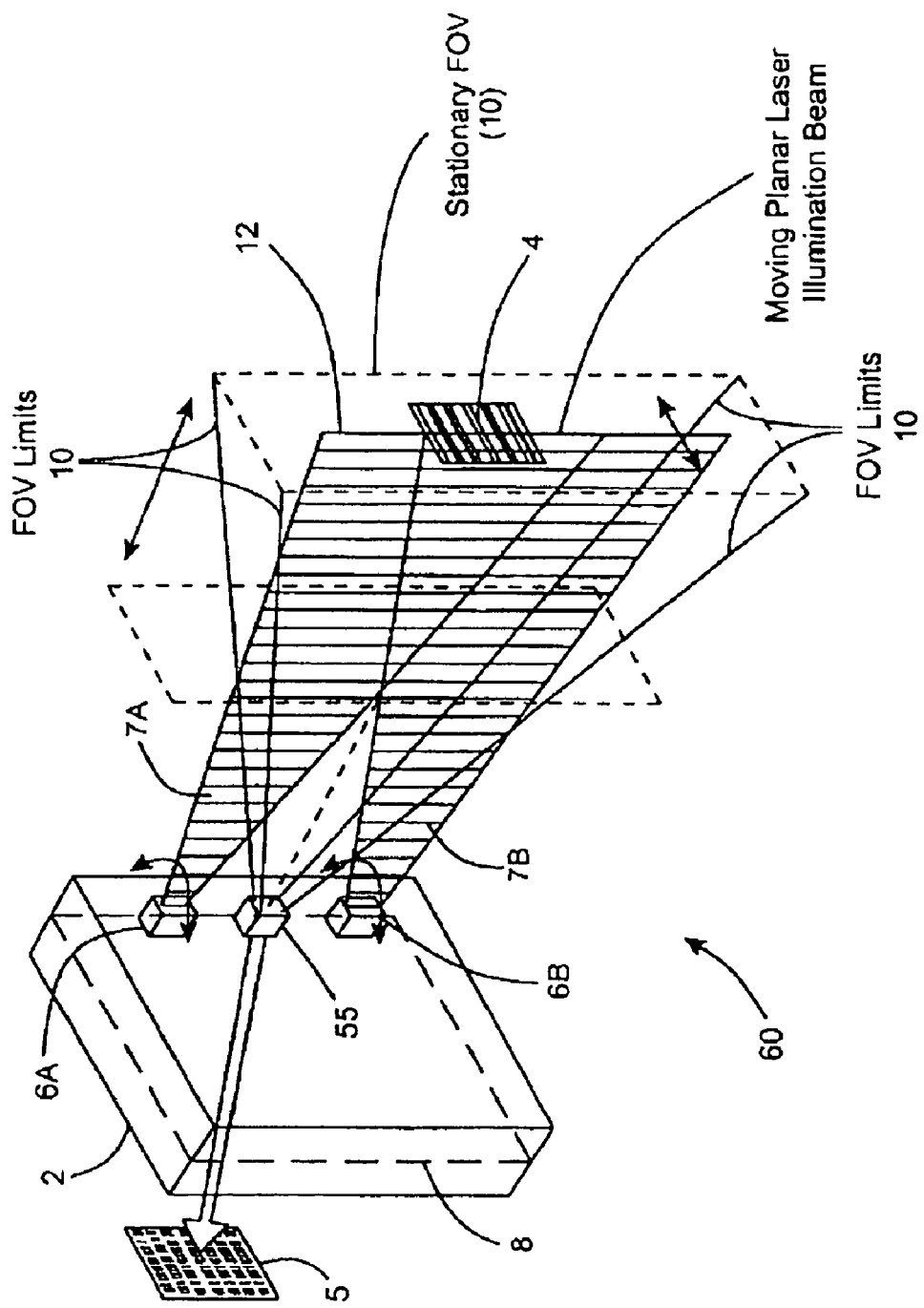

| | | | |
|---|---|---|---|
| 5,532,467 A | 7/1996 | Roustaei | 235/462.42 |
| 5,615,003 A | 3/1997 | Hermary | 356/3.03 |
| 5,621,203 A | 4/1997 | Swartz | 235/462.11 |
| 5,627,358 A | 5/1997 | Roustaei | 235/462 |
| 5,641,219 A | 6/1997 | Mizobe | 362/26 |
| 5,672,858 A | 9/1997 | Li | 235/462 |
| 5,710,417 A | 1/1998 | Joseph | 235/462.11 |
| 5,756,981 A | 5/1998 | Roustaei | 235/462 |
| 5,777,314 A | 7/1998 | Roustaei | 235/462 |
| 5,786,582 A | 7/1998 | Roustaei | 235/462 |
| 5,986,745 A | 11/1999 | Hermary | 356/3.03 |
| 5,988,506 A | 11/1999 | Schabam | 235/462.1 |
| 6,123,261 A | 9/2000 | Roustaei | 235/462.01 |
| 6,166,770 A | 12/2000 | Yasuda | 348/350 |
| 6,223,988 B1 | 5/2001 | Batterman | 235/472.01 |
| 6,230,975 B1 | 5/2001 | Colley | 235/462.06 |
| 6,621,070 B2 * | 9/2003 | Ahten et al. | 250/234 |
| 6,629,641 B2 | 10/2003 | Tsikos | 235/462.01 |
| 6,631,842 B1 | 10/2003 | Tsikos | 235/454 |
| 6,633,350 B2 | 10/2003 | Sasakura | 349/62 |
| 6,732,929 B2 | 5/2004 | Good et al. | 235/462.01 |
| 6,736,321 B2 | 5/2004 | Tsikos | 235/462.14 |
| 6,742,711 B2 | 6/2004 | Tsikos | 235/472.01 |
| 6,764,008 B2 | 7/2004 | Tsikos | 235/462.01 |
| 6,776,494 B2 | 8/2004 | Fujino | 362/600 |
| 6,786,414 B2 | 9/2004 | Tsikos | 235/472.01 |
| 6,837,437 B2 | 1/2005 | Tsikos | 235/472.01 |
| 6,871,982 B2 | 3/2005 | Holman | 362/331 |
| 6,877,662 B2 | 4/2005 | Tsikos | 235/462.01 |
| 6,896,184 B2 | 5/2005 | Tsikos | 235/454 |
| 6,913,202 B2 | 7/2005 | Tsikos | 235/472.01 |
| 2001/0046133 A1 | 11/2001 | Ramer | 362/298 |
| 2002/0114161 A1 | 8/2002 | Barnett | 362/282 |
| 2003/0102379 A1 | 6/2003 | Tsikos | 235/462.45 |
| 2005/0017074 A1 | 1/2005 | Tsikos | 235/454 |
| 2005/0023353 A1 | 2/2005 | Tsikos | 235/454 |

* cited by examiner

FIG. 1A1
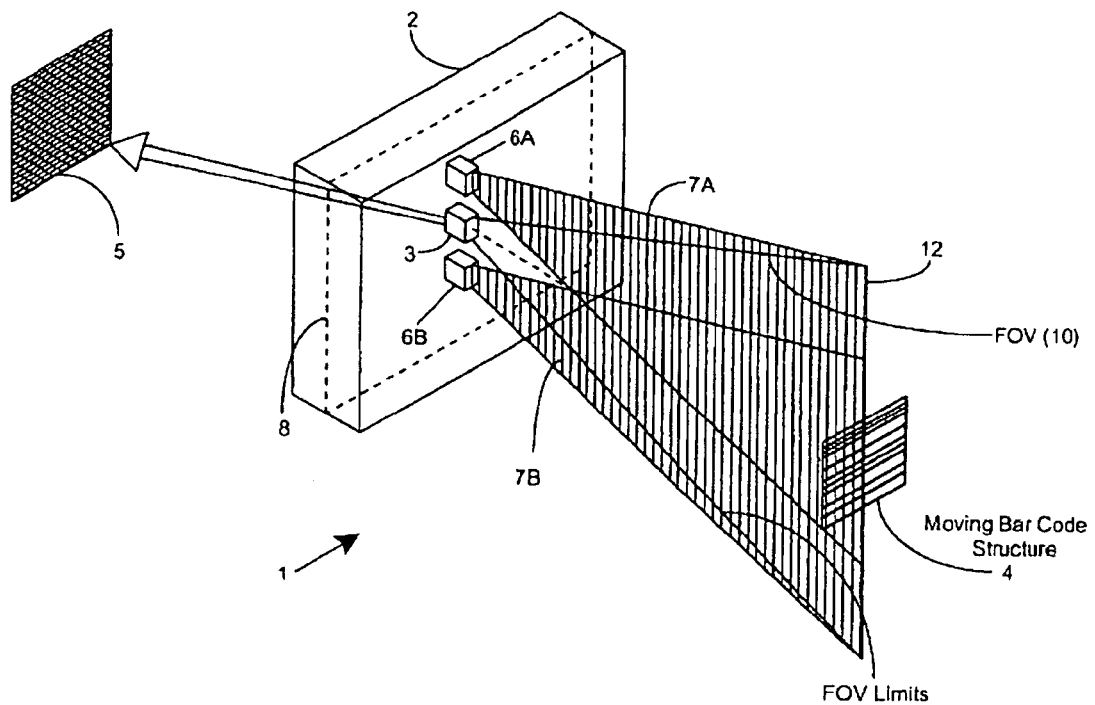
FIG. 1A2
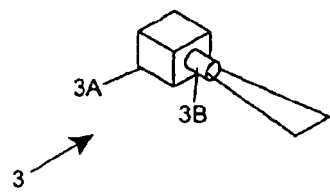

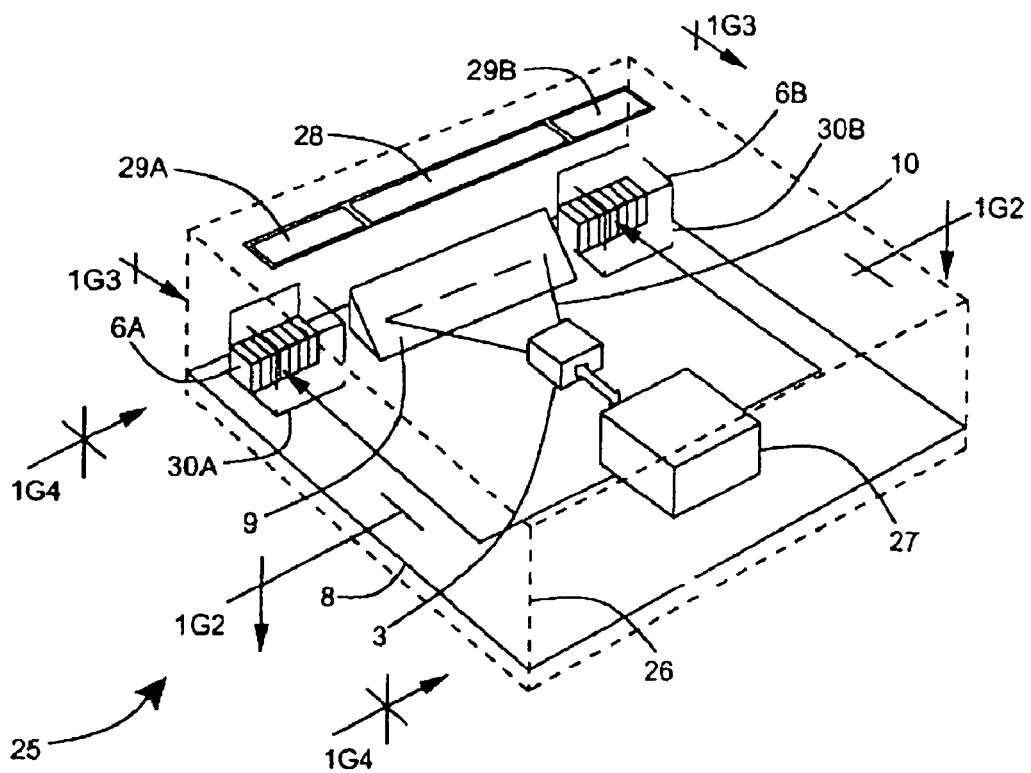
FIG. 1B1

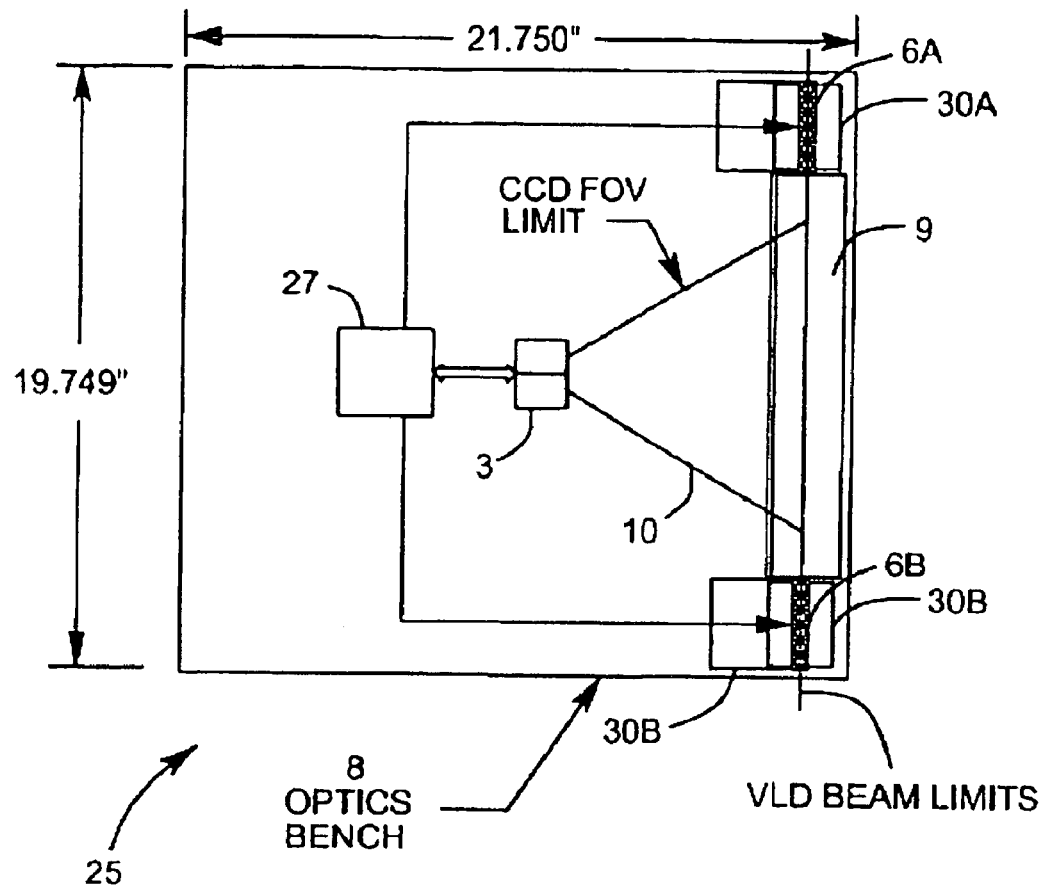
FIG. 1B2

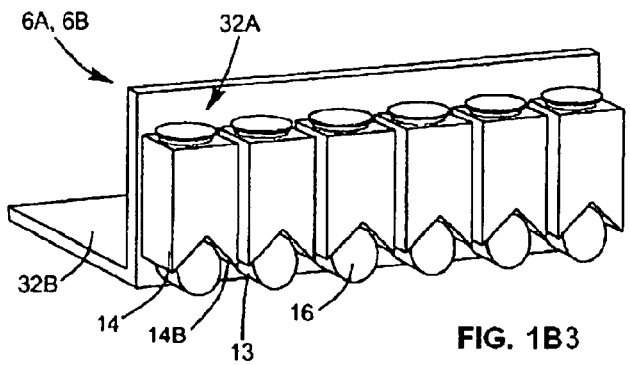
FIG. 1B3
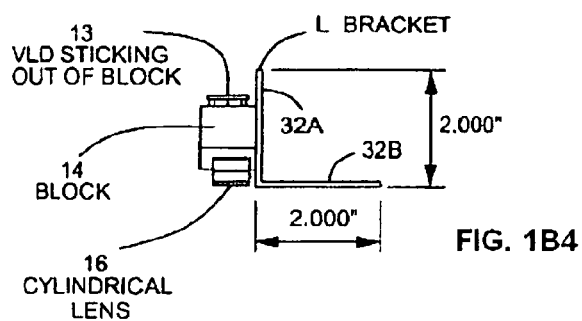
FIG. 1B4
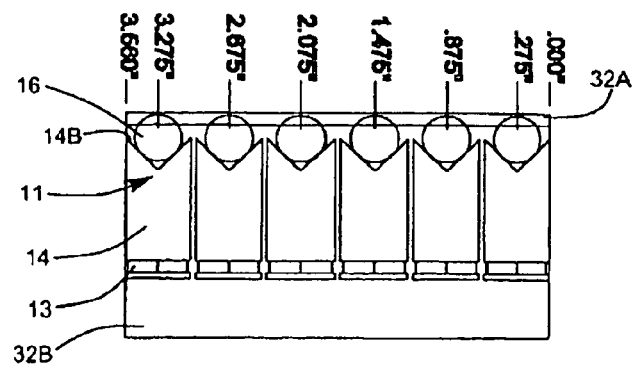
FIG. 1B5

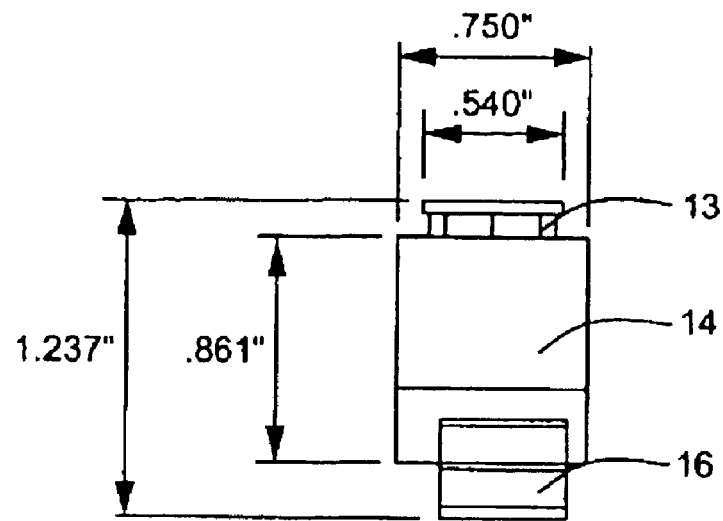
FIG. 1C1
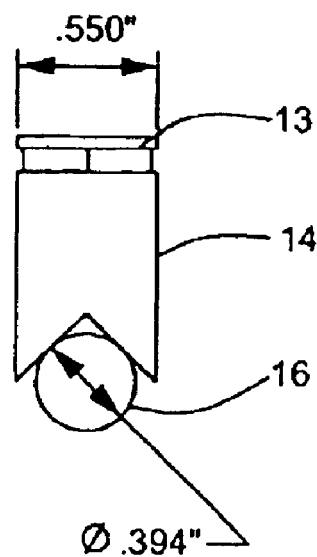
FIG. 1C2

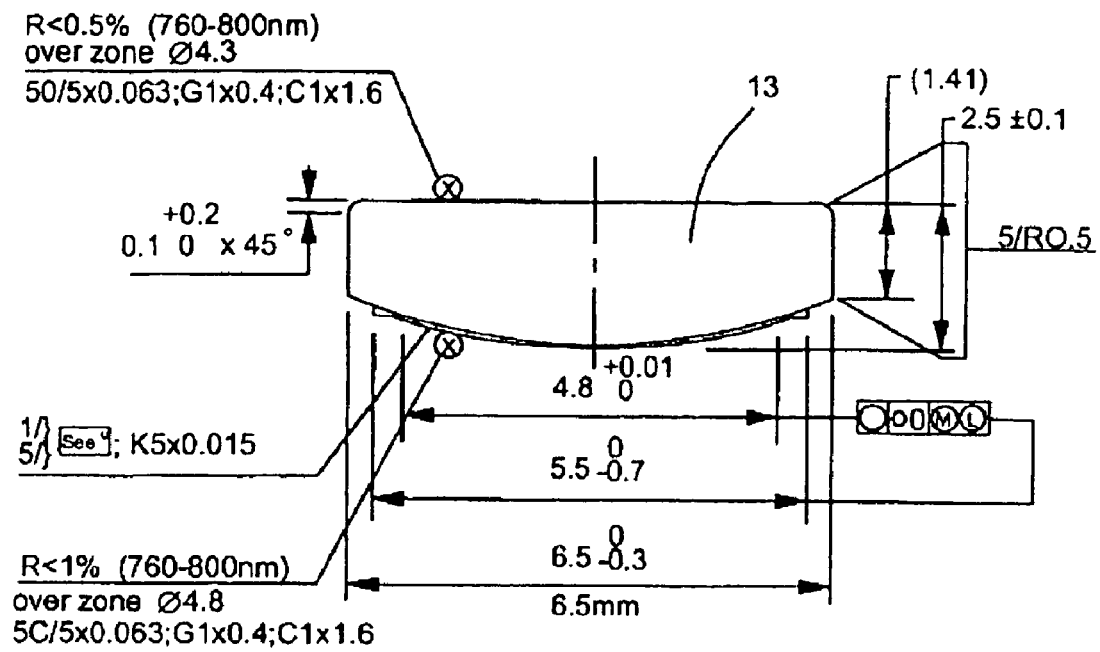
FIG. 1D1
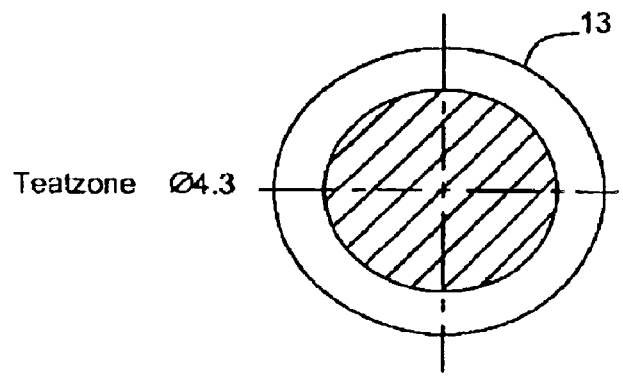
FIG. 1D2

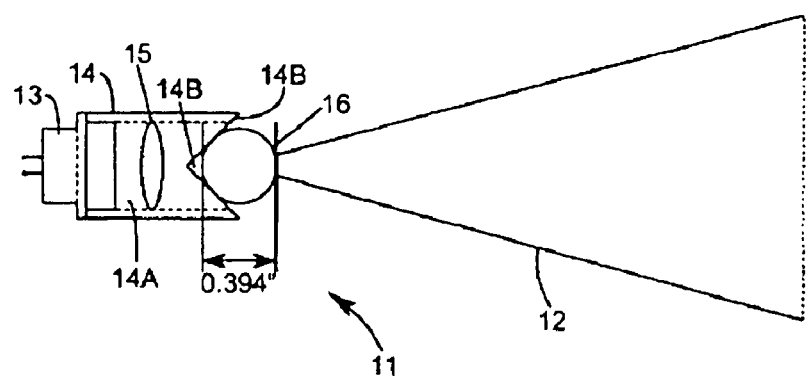
FIG. 1E1
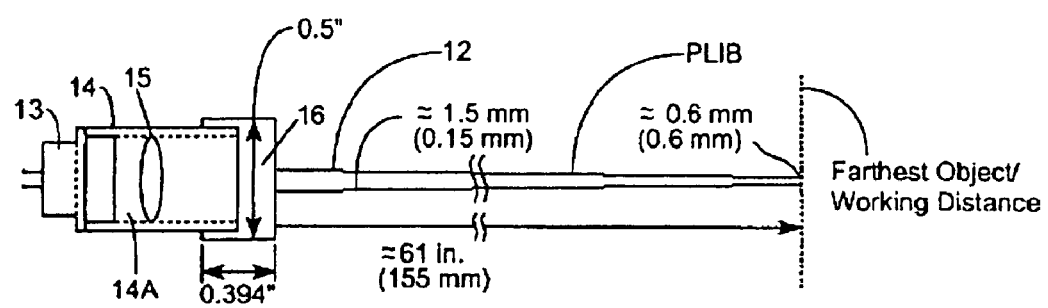
FIG. 1E2

FIG. 3A1
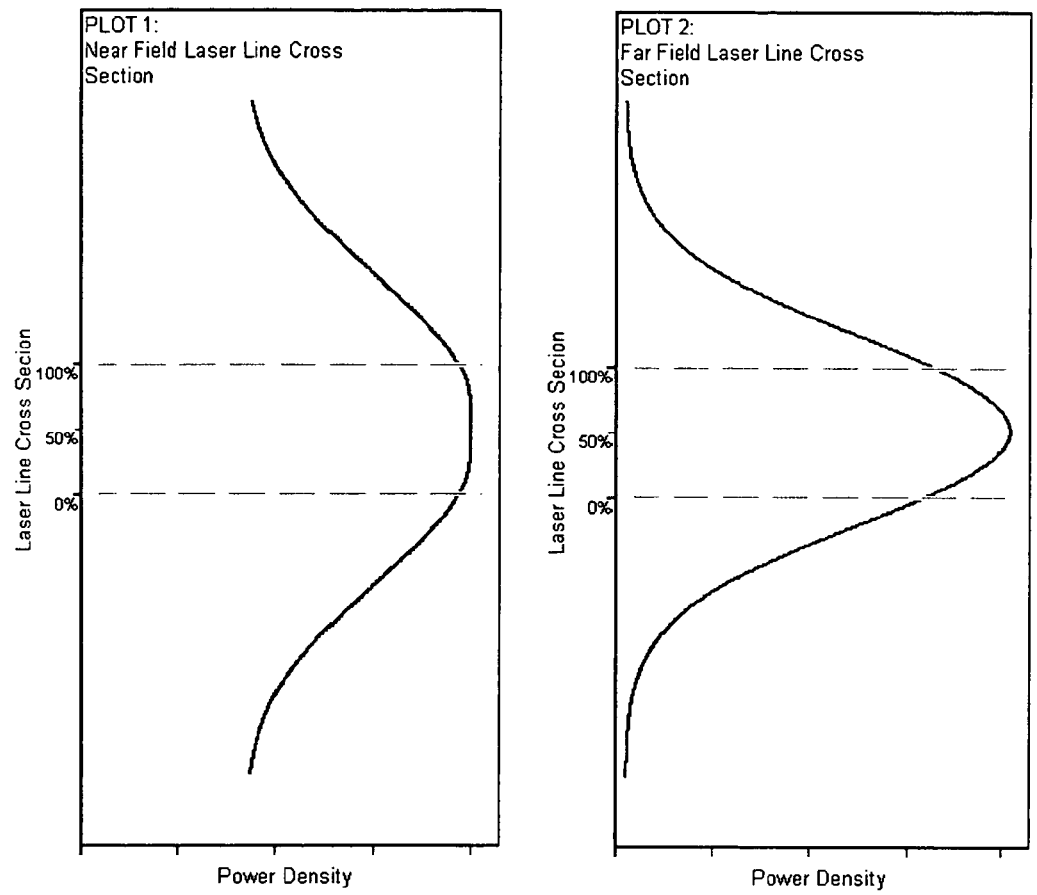
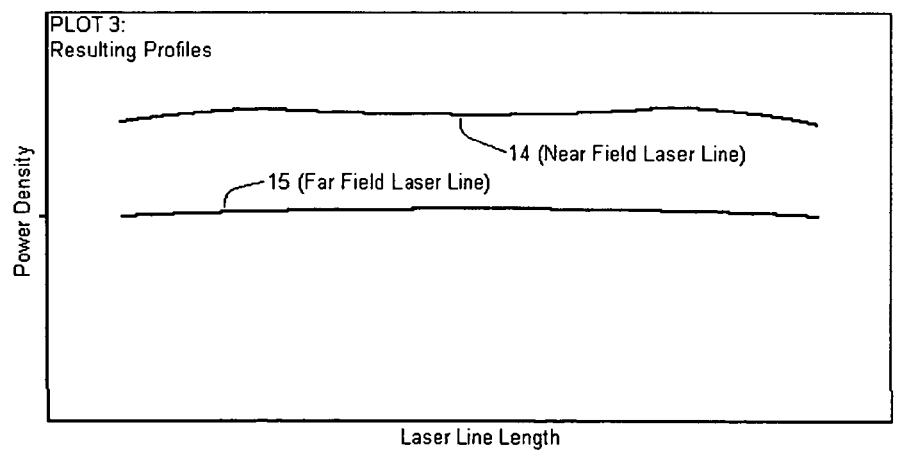

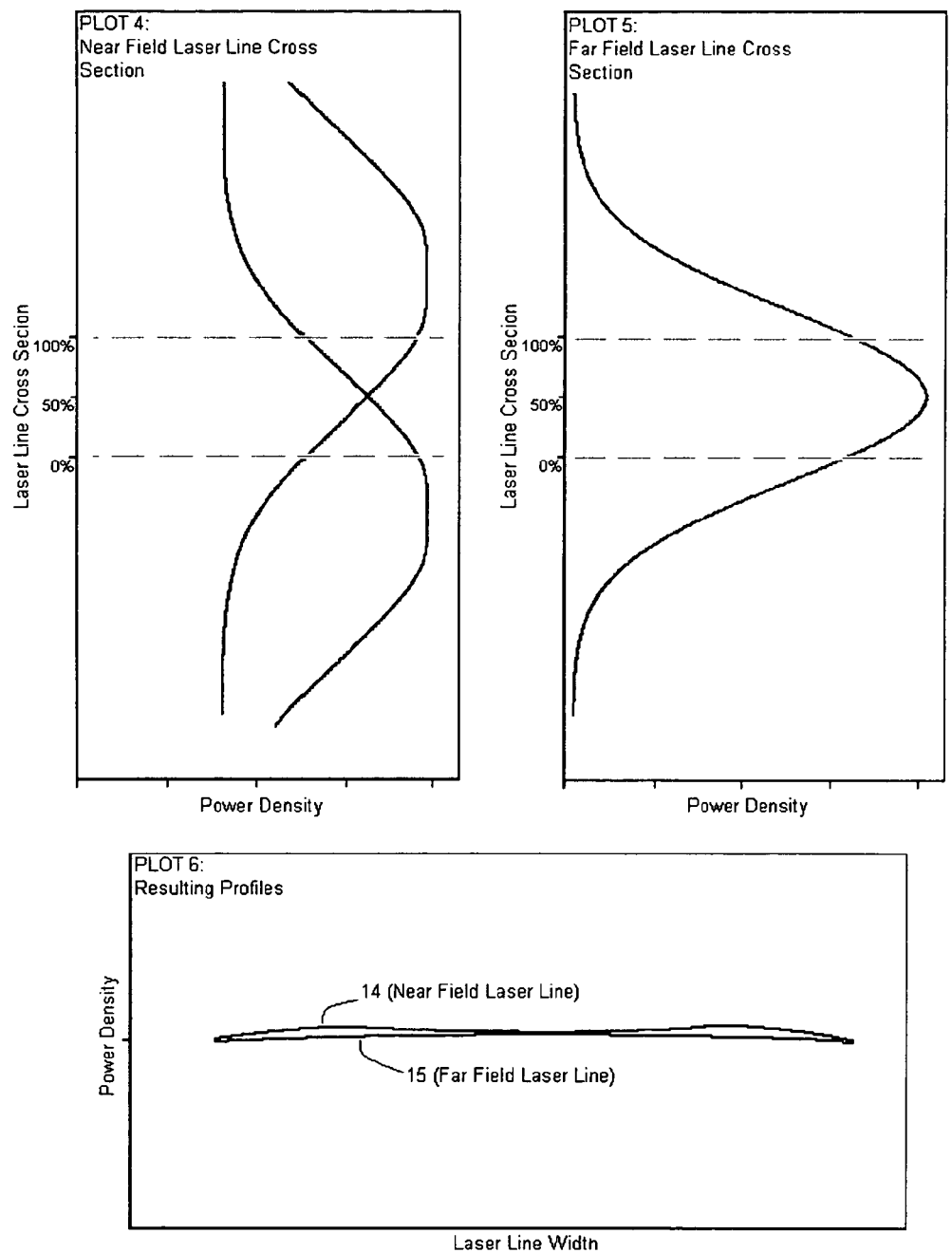

FIG. 3A3
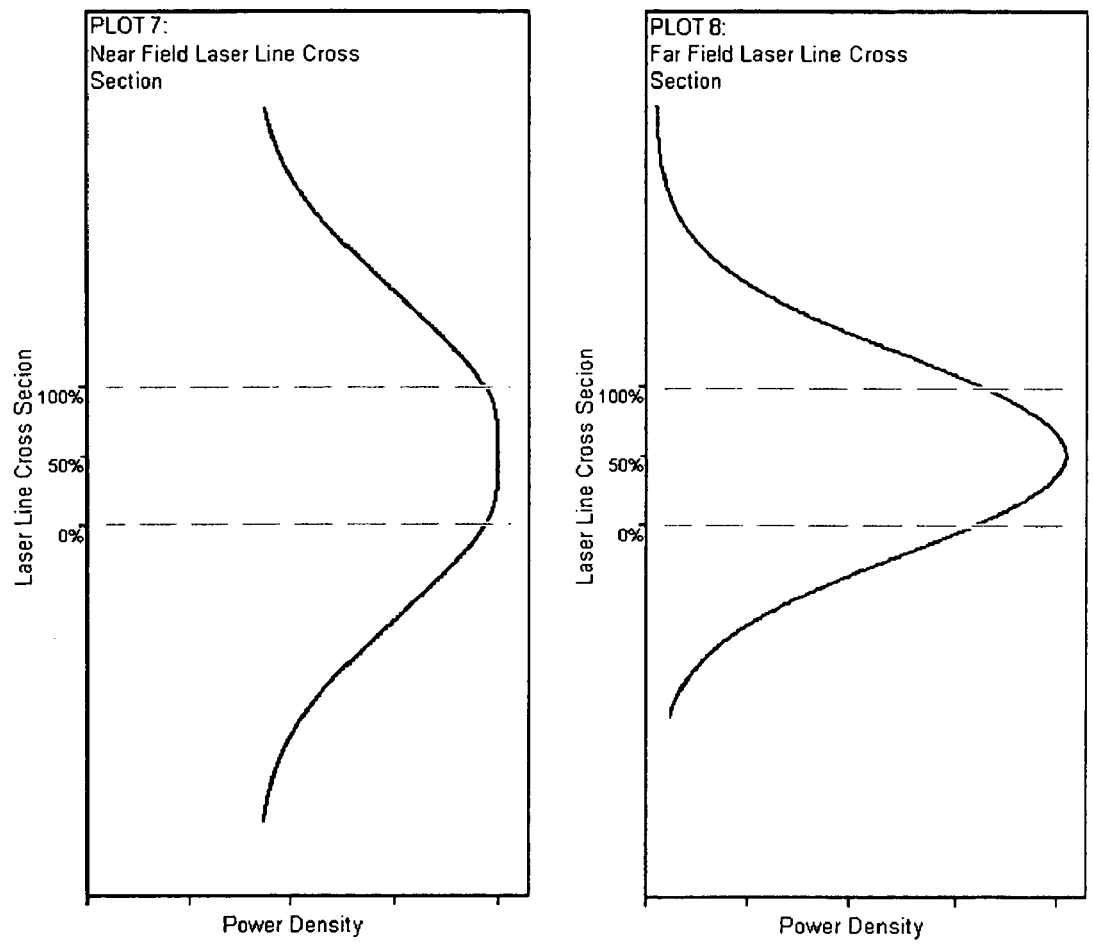
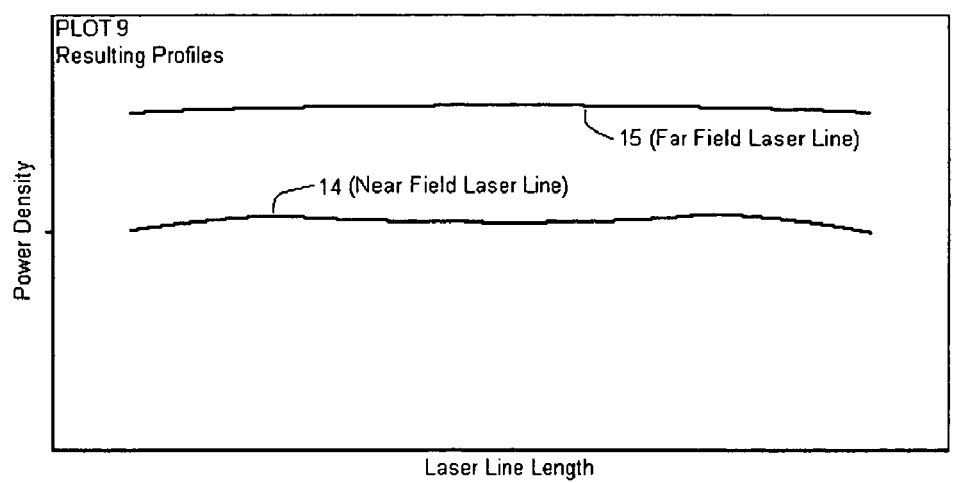

FIG. 3A4
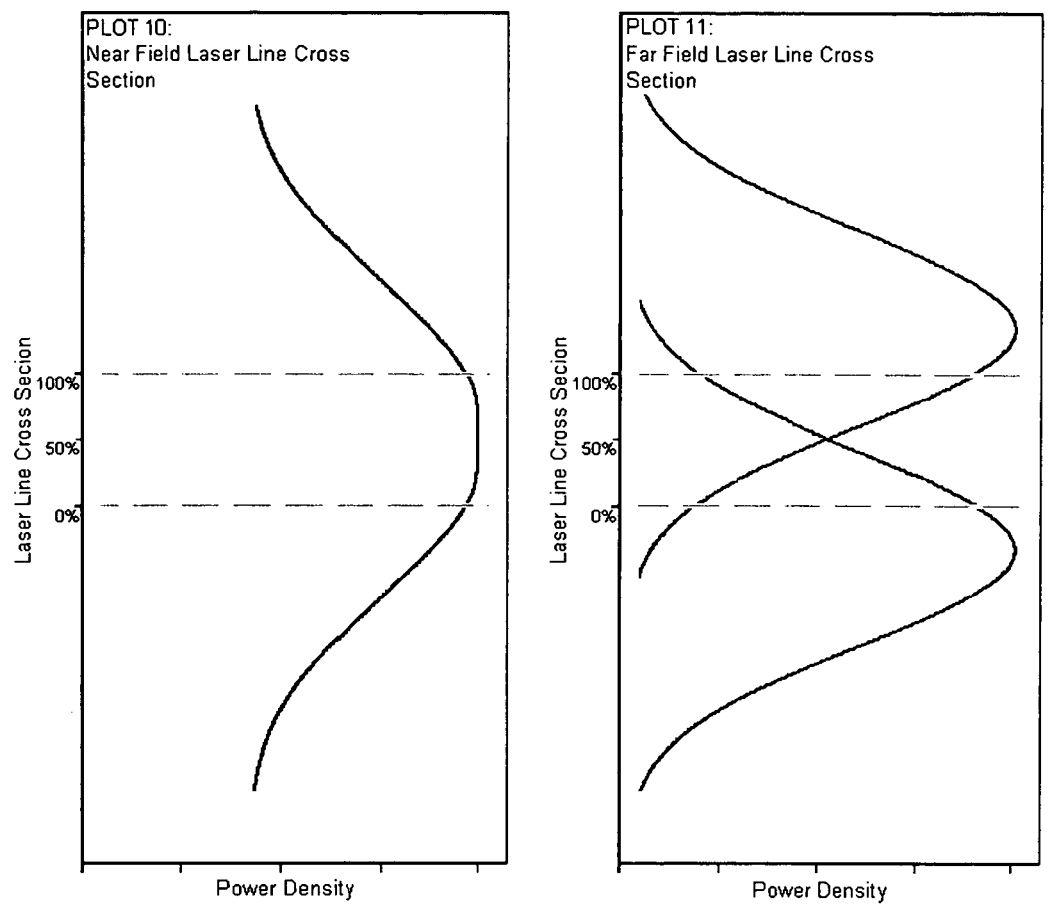
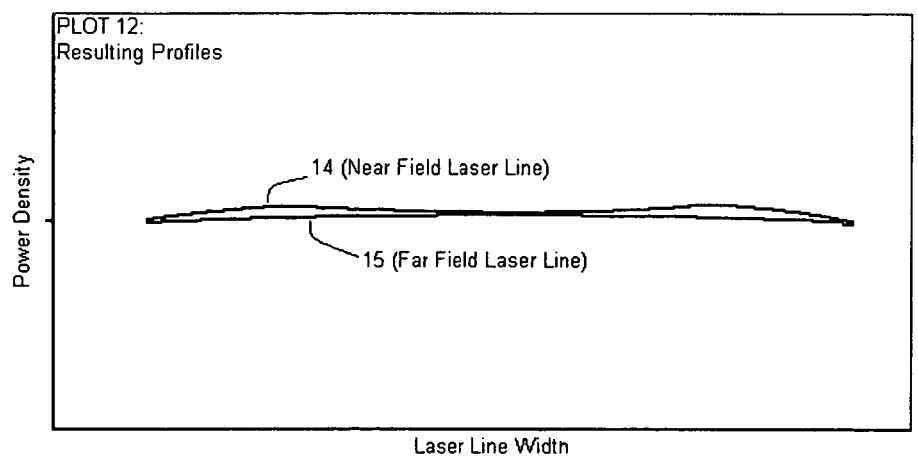

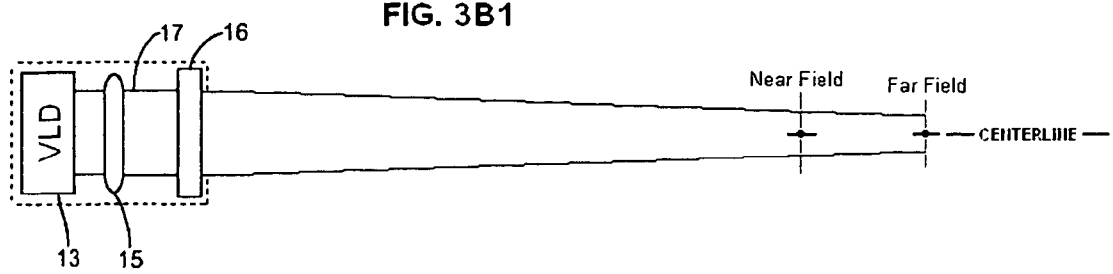
FIG. 3B1
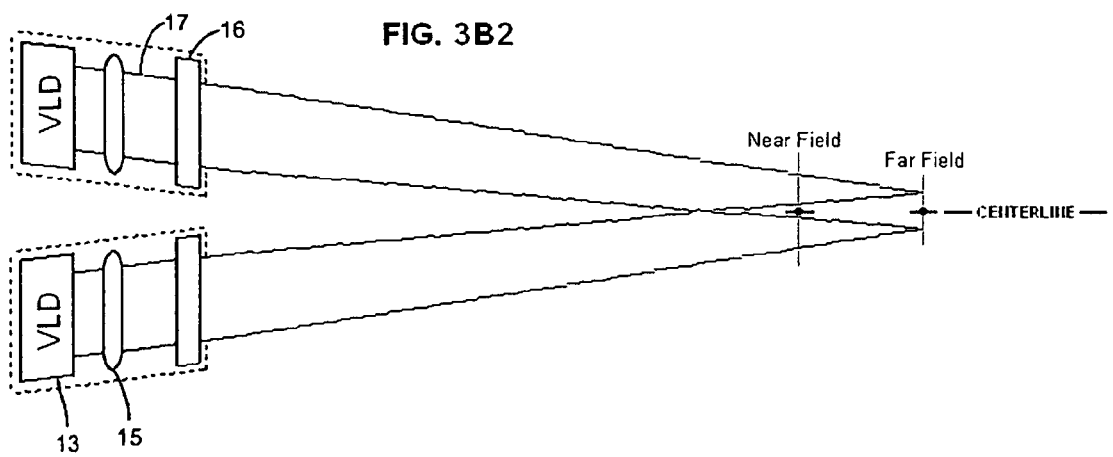
FIG. 3B2
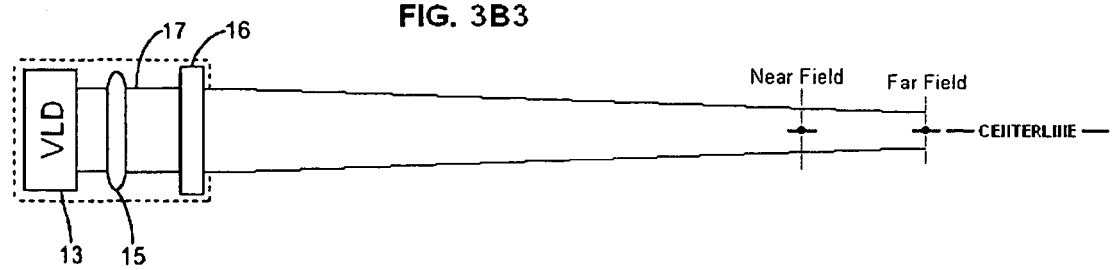
FIG. 3B3
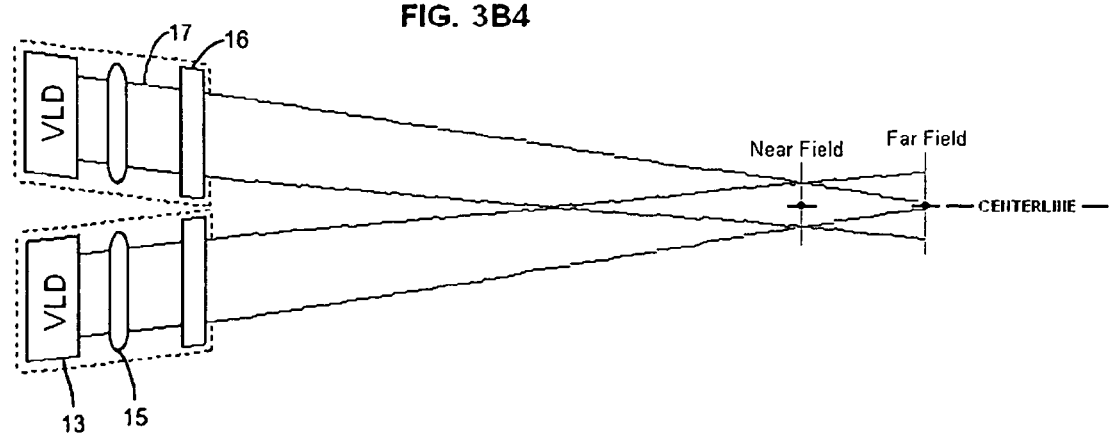
FIG. 3B4

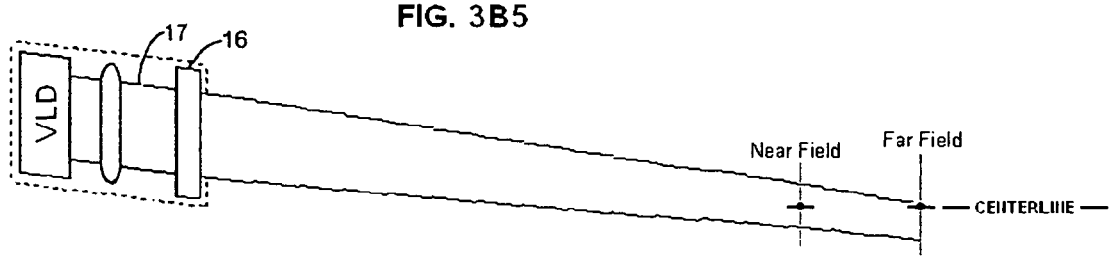
FIG. 3B5
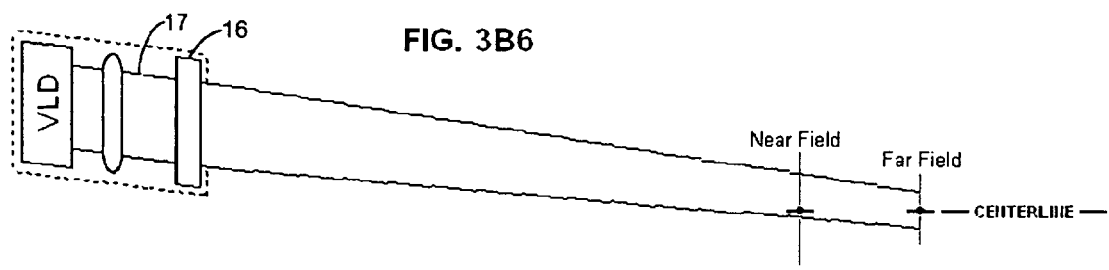
FIG. 3B6

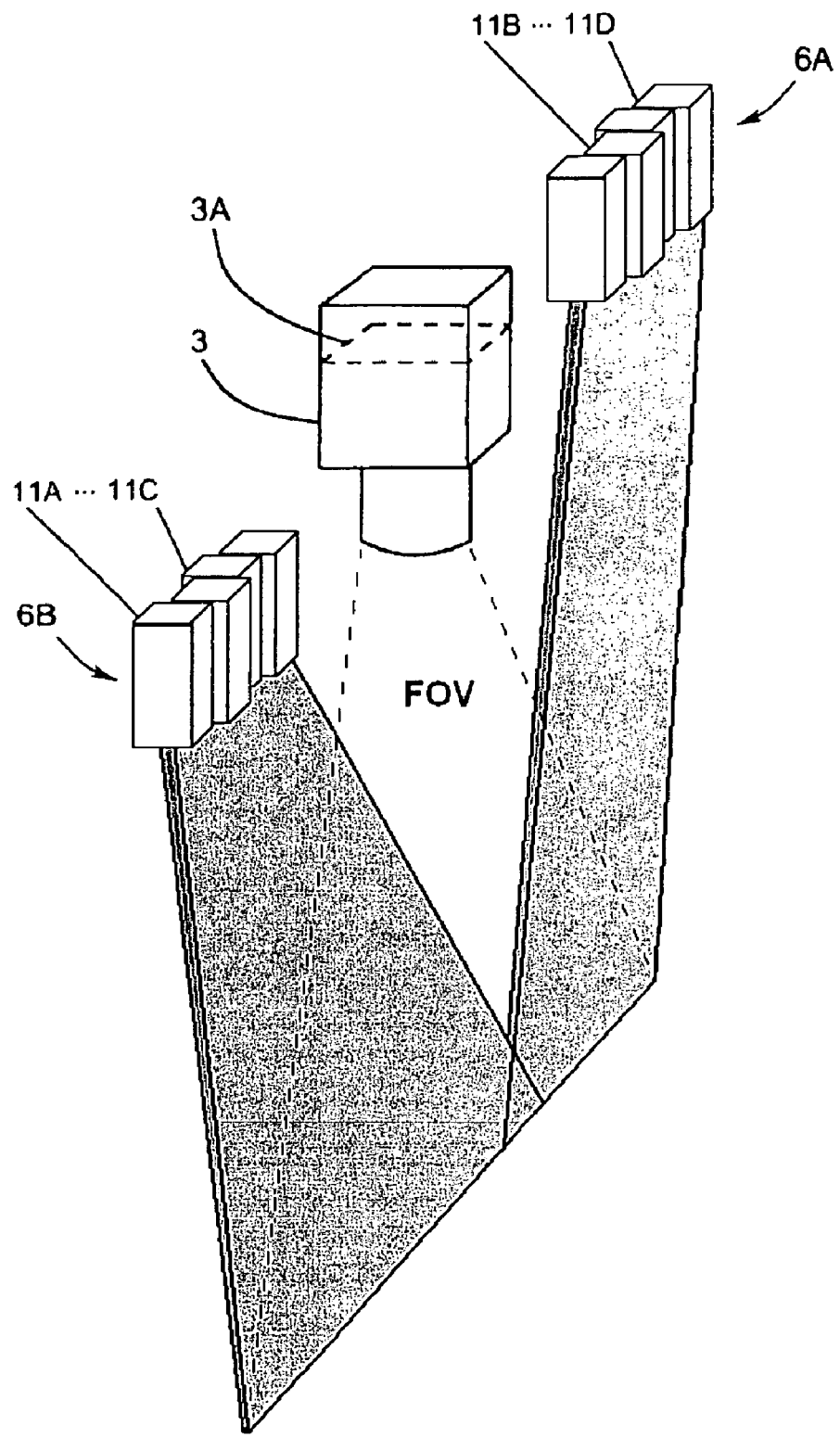
FIG. 4A1

FIG. 4A2
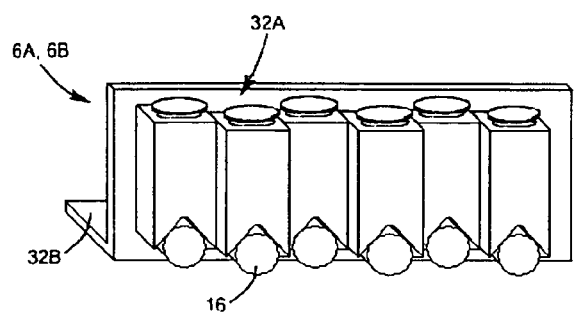
FIG. 4A3
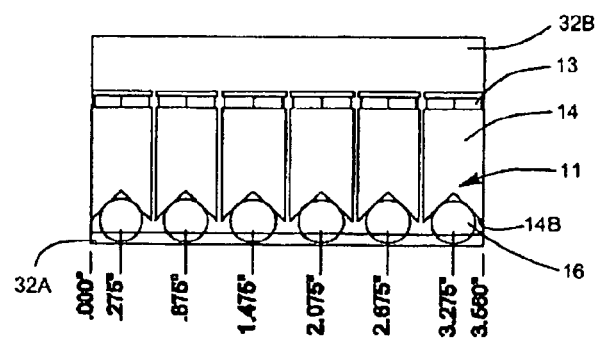

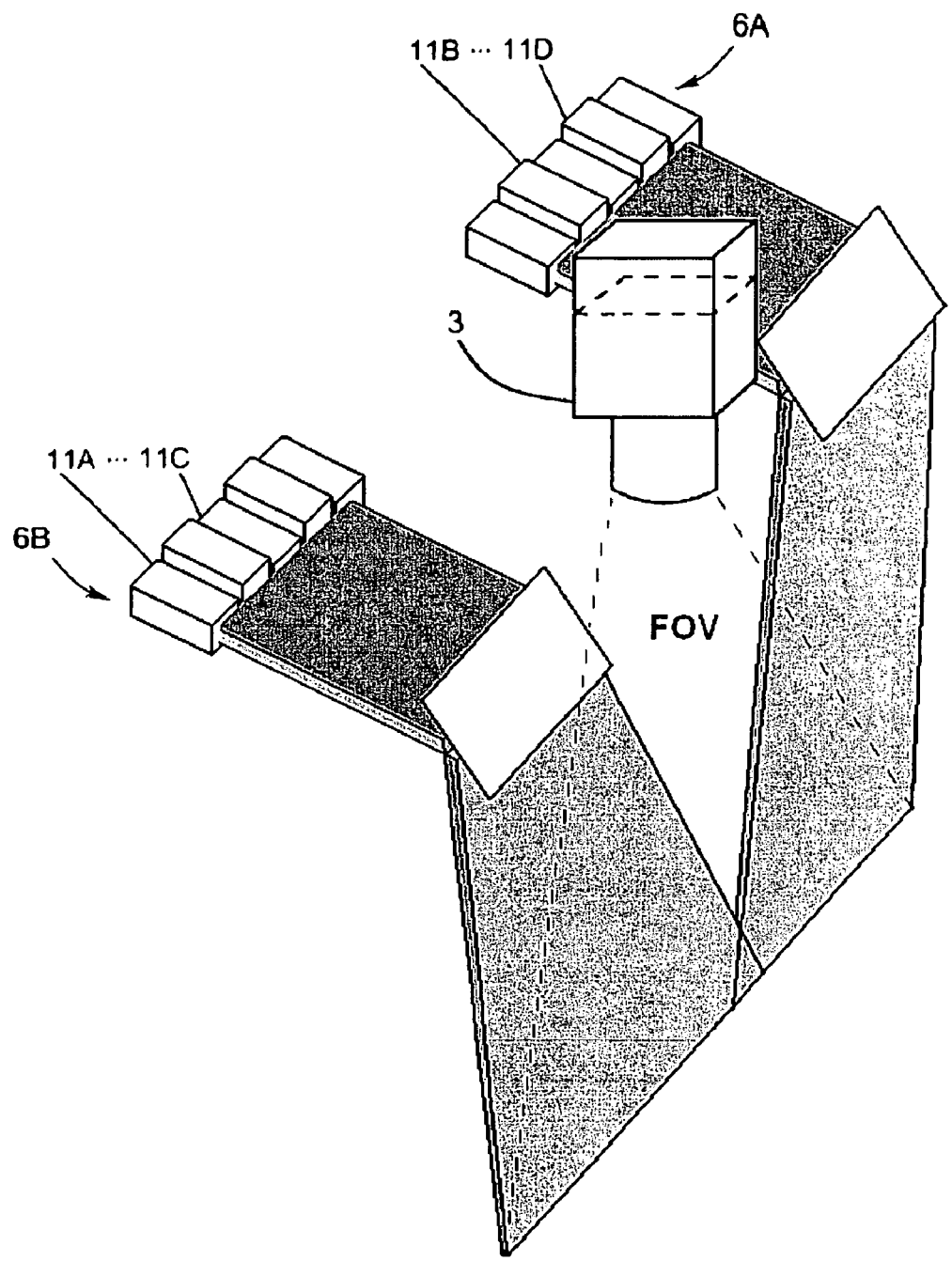
FIG. 4A4

METHOD OF AND SYSTEM FOR PROFILE EQUALIZATION EMPLOYING VISIBLE LASER DIODE (VLD) DISPLACEMENT

This application claims the benefit of U.S. Provisional Patent Application having Ser. No. 60/678,884, filed on May 6, 2005, which is hereby incorporated by reference. This application is a continuation-in-part of patent application Ser. No. 10/639,362, filed on Aug. 12, 2003, now U.S. Pat. No. 7,143,943, which is a continuation of patent application Ser. No. 09/780,027, filed on Feb. 9, 2001, now U.S. Pat. No. 6,629,641, which is a continuation-in-part of patent application Ser. No. 09/721,885, filed on Nov. 24, 2000, now U.S. Pat. No. 6,631,842.

BACKGROUND OF THE INVENTION

1. Technical Field

The present invention relates generally to an improved method of and system for profile equalization employing visible laser diode (VLD) displacement during image formation and detection operations, and also to an improved method of and system for producing digital images using such improved object illumination.

2. Brief Description of the Prior Art

The use of image-based bar code symbol readers and scanners is well known in the field of auto-identification. Examples of image-based bar code symbol reading/scanning systems include hand-hand scanners, point-of-sale (POS) scanners, and industrial-type conveyor scanning systems.

Presently, most commercial image-based bar code symbol readers are constructed using charge-coupled device (CCD) image sensing/detecting technology. Unlike laser-based scanning technology, CCD imaging technology has particular illumination requirements which differ from application to application.

Most prior art CCD-based image scanners, employed in conveyor-type package identification systems, require high-pressure sodium, metal halide or halogen lamps and large, heavy and expensive parabolic or elliptical reflectors to produce sufficient light intensities to illuminate the large depth of fields supported by such industrial scanning systems. Even when the light from such lamps is collimated or focused using such reflectors, light strikes the target object other than where the imaging optics of the CCD-based camera are viewing. Since only a small fraction of the lamps output power is used to illuminate the CCD camera's field of view, the total output power of the lamps must be very high to obtain the illumination levels required along the field of view of the CCD camera. The balance of the output illumination power is simply wasted in the form of heat.

Most prior art CCD-based hand-held image scanners use an array of light emitting diodes (LEDs) to flood the field of view of the imaging optics in such scanning systems. A large percentage of the output illumination from these LED sources is dispersed to regions other than the field of view of the scanning system. Consequently, only a small percentage of the illumination is actually collected by the imaging optics of the system. Examples of prior art CCD hand-held image scanners employing LED illumination arrangements are disclosed in U.S. Pat. Nos. 5,777,314, 5,756,981, 5,627,358, 5,484,994, 5,786,582, and 6,123,261 to Roustaei, each assigned to Symbol Technologies, Inc. and incorporated herein by reference in its entirety. In such prior art CCD-based hand-held image scanners, an array of LEDs are mounted in a scanning head in front of a CCD-based image sensor that is provided with a cylindrical lens assembly. The LEDs are arranged at an angular orientation relative to a central axis passing through the scanning head so that a fan of light is emitted through the light transmission aperture thereof that expands with increasing distance away from the LEDs. The intended purpose of this LED illumination arrangement is to increase the "angular distance" and "depth of field" of CCD-based bar code symbol readers. However, even with such improvements in LED illumination techniques, the working distance of such hand-held CCD scanners can only be extended by using more LEDs within the scanning head of such scanners to produce greater illumination output there from, thereby increasing the cost size and weight of such scanning devices.

Similarly, prior art "hold-under" and "hands-free presentation" type CCD-based image scanners suffer from shortcomings and drawbacks similar to those associated with prior art CCD-based hand-held image scanners.

Recently, there have been some technological advances made relating to planar laser illumination techniques employed in vision-based industrial bar code scanners, in particular, U.S. Pat. Nos. 6,629,641, 6,631,842, 6,732,929, 6,736,321, 6,742,711, 6,764,008, 6,786,414, and 6,837,437 being commonly owned by Assignee, Metrologic Instruments, Inc., of Blackwood, N.J., and incorporated herein by reference in it's entirely.

There have also been some technological advances made relating to the laterally aiming of laser illumination techniques in CCD-based image capture systems, employed to flatten illumination profiles across the width of conveyor belts, in particular, U.S. Pat. No. 6,732,929. A consideration when designing laser illumination techniques in CCD-based image capture systems is the equalization of the illumination profile from near field to far field, such that the image brightness is substantially the same independent of object distance from the image scanner. As disclosed in U.S. Pat. No. 6,732,929, this can be accomplished, at least in part, by controlling the width of the laser line, in particular by causing the laser line to decrease in width from near field to far field. In this manner, the gain in power density due to the decreasing laser line width offsets the loss in power density due to the increasing laser line length, resulting in equalized profiles throughout the depth of field.

However, there may be situations in which controlling the laser line width is insufficient to achieve complete equalization of the illumination profiles. Depending on the constraints of the application, it may not be possible to achieve the desired laser line widths at the necessary distances from the image scanner. Thus, there is a great need in the art for an improved method of and system for profile equalization.

OBJECTS AND SUMMARY OF THE PRESENT INVENTION

Accordingly, a primary object of the present invention is to provide an improved method of and system for illuminating the surface of objects during image formation and detection operations and also improved methods of and systems for producing digital images using such improved object illumination, while avoiding the shortcomings and drawbacks of prior art systems and methodologies.

Another object of the present invention is to provide an improved method of and system for equalizing the power density produced by a linear array of laser light emitting devices, while avoiding the shortcomings and drawbacks of prior art systems and methodologies.

In each illustrative embodiment of the present invention, the substantially planar laser illumination beams are preferably produced from a planar laser illumination beam array (PLIA) comprising a plurality of planar laser illumination modules (PLIMs). Each PLIM comprises a visible laser diode (VLD), a focusing lens, and a cylindrical optical element arranged therewith. These and other objects of the present invention will become apparent hereinafter and in the Claims to Invention.

BRIEF DESCRIPTIONS OF THE DRAWINGS

For a more complete understanding of the present invention, the following Detailed Description of the Illustrative Embodiments of the Present Invention should be read in conjunction with the accompanying Drawings, wherein:

FIG. 1A1 is a schematic representation of a first generalized embodiment of the planar laser illumination and (electronic) imaging system (PLIIM) of the present invention, wherein a pair of planar laser illumination arrays (PLIAs) are mounted on opposite sides of a linear (i.e. 1-dimensional) type image formation and detection module (IFDM) having a fixed focal length imaging lens, a fixed focal distance and fixed field of view, such that the PLIAs produce a stationary (i.e. non-scanned) plane of laser beam illumination which is disposed substantially coplanar with the field of view of the IFDM during object illumination and image detection operations carried out by the PLIIM system on a moving bar code symbol or other graphical structure;

FIG. 1A2 is a schematic representation of a first generalized embodiment of the linear (i.e. 1-dimensional) type IFDM of the present invention;

FIG. 1B1 is a schematic representation of an exemplary realization of the PLIIM system of FIG. 1A1, shown comprising a linear IFDM, a pair of PLIAs, and a field of view (FOV) folding mirror for folding the fixed field of view of the linear IFDM in a direction that is coplanar with the plane of laser illumination beams produced by the PLIAs;

FIG. 1B2 is a plan view of an exemplary realization of the PLIIM system of FIG. 1A1;

FIG. 1B3 is a perspective view of the planar laser illumination array (PLIA) employed in the PLIIM system of FIG. 1A1, showing an array of visible laser diodes (VLDs), each mounted within a VLD mounting block wherein a focusing lens is mounted and on the end of which there is a v-shaped notch or recess, within which a cylindrical lens element is mounted, and wherein each such VLD mounting block is mounted on an L-bracket for mounting within the housing of the PLIIM system;

FIG. 1B4 is an elevated end view of the PLIA employed in the PLIIM system of FIG. 1A1;

FIG. 1B5 is an elevated side view of the PLIA employed in the PLIIM system of FIG. 1A1;

FIG. 1C1 is an elevated side view of one of the VLD mounting blocks employed in the PLIIM system of FIG. 1A1, taken along a viewing direction which is orthogonal to the central axis of the cylindrical lens element mounted to the end portion of the VLD mounting block;

FIG. 1C2 is an elevated plan view of one of the VLD mounting blocks employed in the PLIIM system of FIG. 1A1, taken along a viewing direction which is parallel to the central axis of the cylindrical lens element mounted to the VLD mounting block;

FIG. 1D1 is an elevated side view of the collimating lens element installed within each VLD mounting block employed in the PLIIM system of FIG. 1A1;

FIG. 1D2 is an axial view of the collimating lens element installed within each VLD mounting block employed in the PLIIM system of FIG. 1A1;

FIG. 1E1 is an elevated plan view of the PLIM employed in the PLIIM system of FIG. 1A1, taken along a viewing direction which is parallel to the central axis of the cylindrical lens element mounted in the VLD mounting block thereof, showing that the cylindrical lens element expands (i.e. spreads out) the laser beam along the direction of beam propagation so that a substantially planar laser illumination beam is produced, which is characterized by a plane of propagation that is coplanar with the direction of beam propagation;

FIG. 1E2 is an elevated plan view of the PLIM employed in the PLIIM system of FIG. 1A1, taken along a viewing direction which is perpendicular to the central axis of the cylindrical lens element mounted within the axial bore of the VLD mounting block thereof, showing that the focusing lens focuses the laser beam to its minimum beam width at a point which is the farthest distance at which the system is designed to capture images, while the cylindrical lens element does not expand or spread out the laser beam in the direction normal to the plane of propagation of the planar laser illumination beam;

FIG. 2 is a schematic representation of a second generalized embodiment of the PLIIM system of the present invention, wherein a pair of PLIAs are mounted on opposite sides of an area (i.e. 2-dimensional) type IFDM having a fixed focal length camera lens, a fixed focal distance and fixed FOV projected through a 3-D scanning region, so that the PLIAs produce a plane of laser beam illumination which is disposed substantially coplanar with sections of the FOV of the IFDM while the planar laser illumination beam is automatically scanned across the 3-D scanning region during object illumination and imaging operations carried out on a bar code symbol or other graphical indicia by the PLIIM system;

FIG. 3A1 is a data plot of a first illustrative embodiment of the present invention. Plot 1 shows a cross section of the composite laser beam produced by the PLIAs at the near field. Plot 2 shows a cross section of the composite laser beam produced by the PLIAs at the far field. Plot 3 shows the resulting power density profile along the laser beam length, wherein the near field illumination is brighter then the far field illumination;

FIG. 3A2 is a data plot of a first illustrative embodiment of the present invention showing a solution to the problem of FIG. 3A1. A first portion of the PLIMs have been displaced in a first direction perpendicular to the plane of the camera's FOV, and a second portion of the PLIMs an equal distance in the opposite direction, wherein their individual laser beam components are angled to overlap precisely at the far field of the camera's FOV. Plot 4 shows a cross section of the composite laser beam produced by the PLIAs at the near field, which is now two distinct laser lines, each formed by half the individual laser lines overlapping. Plot 5 shows a cross section of the composite laser beam produced by the PLIAs at the far field. Plot 6 shows the resulting power density profile along the laser beam length, with the near field illumination reduced in brightness to equal the far field illumination;

FIG. 3A3 is a data plot of a first illustrative embodiment of the present invention. Plot 7 shows a cross section of the composite laser beam produced by the PLIAs at the near field. Plot 8 shows a cross section of the composite laser beam produced by the PLIAs at the far field. Plot 9 shows the resulting power density profile along the laser beam length, wherein the far field illumination is brighter then the near field illumination;

FIG. 3A4 is a data plot of a first illustrative embodiment of the present invention showing a solution to the problem of FIG. 3A3. A first portion of the PLIMs have been displaced in a first direction perpendicular to the plane of the camera's FOV, and a second portion of the PLIMs an equal distance in the opposite direction, wherein their individual laser beam components are angled to overlap precisely at the near field of the camera's FOV. Plot 10 shows a cross section of the composite laser beam produced by the PLIAs at the near field. Plot 11 shows a cross section of the composite laser beam produced by the PLIAs at the far field, which is now two distinct laser lines, each formed by half the individual laser lines overlapping. Plot 12 shows the resulting power density profile along the laser beam length, with the far field illumination reduced in brightness to equal the near field illumination;

FIG. 3B1 is a geometrical model of a first illustrative embodiment of the present invention shown in FIG. 3A1;

FIG. 3B2 is a geometrical model of a first illustrative embodiment of the present invention shown in FIG. 3A2;

FIG. 3B3 is a geometrical model of a first illustrative embodiment of the present invention shown in FIG. 3A3;

FIG. 3B4 is a geometrical model of a first illustrative embodiment of the present invention shown in FIG. 3A4;

FIG. 3B5 is a geometrical model of an alternative illustrative embodiment of the present invention showing all the PLIMs displaced in the same direction so the near field of the camera's FOV receives the maximum illumination and the illumination incident on the far field of the camera's FOV is reduced;

FIG. 3B6 is a geometrical model of an alternative illustrative embodiment of the present invention showing all the PLIMs displaced in the same direction so the far field of the camera's FOV receives the maximum illumination and the illumination incident on the near field of the camera's FOV is reduced;

FIG. 4A1 is a schematic representation of a first illustrative embodiment of the PLIIM system of the present invention, comprising a linear IFDM, and a pair of PLIAs, wherein a first portion of the individual PLIMs have been displaced in one direction perpendicular to the plane of the camera's FOV, and a second portion of the individual PLIMs an equal distance in the opposite direction.

FIG. 4A2 is a perspective view of a PLIA comprising a plurality of PLIMs employed in the PLIIM system of FIG. 4A1, wherein a first portion of the PLIMs have been displaced in a first direction perpendicular to the plane of the camera's FOV, and a second portion of the PLIMs an equal distance in the opposite direction.

FIG. 4A3 is an elevated side view of the PLIA employed in the PLIIM system of FIG. 4A1.

FIG. 4A4 is a schematic representation of an alternative illustrative embodiment of the PLIIM system of the present invention, showing a linear IFDM having a field of view, a pair of PLIAs, wherein the PLIMs are staggered, for producing first and second composite planar laser illumination beams, and a pair of stationary planar laser beam folding mirrors provided so as to fold the optical paths of the first and second composite planar laser illumination beams such that the planes of the first and second composite planar laser illumination beams are in a direction that is coplanar with the field of view of the IFDM.

DETAILED DESCRIPTION OF THE ILLUSTRATIVE EMBODIMENTS OF THE PRESENT INVENTION

Referring to the figures in the accompanying drawings, the preferred embodiments of the method of and system for profile equalization employing visible laser diode (VLD) dis-placement of the present invention will be described in great detail, wherein like elements will be indicated using like reference numerals.

1. Overview of the Planar Laser Illumination and Electronic Imaging (PLIIM) System of the Present Invention:

In accordance with the principles of the present invention, an object (e.g. a bar coded package, textual materials, graphical indicia, etc.) is illuminated by a substantially planar laser illumination beam having substantially-planar spatial distribution characteristics along a planar direction which passes through the field of view (FOV) of an image formation and detection module (e.g. realized within a CCD-type digital electronic camera, or a 35 mm optical-film photographic camera), while images of the illuminated object are formed and detected by the image formation and detection module.

This inventive principle of coplanar laser illumination and image formation is embodied in two different classes of the PLIIM, namely: (1) in PLIIM systems shown in FIG. 1A1, wherein the image formation and detection modules employ linear-type (1-D) image detection arrays; and (2) in PLIIM systems shown in FIG. 2, wherein the image formation and detection modules employ area-type (2-D) image detection arrays. Illustrative examples of these two different classes were previously disclosed in co-pending patent application Ser. No. 10/639,362 filed on Aug. 12, 2003, incorporated herein by reference in it's entirely.

The PLIIM system as shown in FIG. 1A1, i.e. those employing linear-type (1-D) image detection arrays, each produce a planar laser illumination beam that is neither scanned nor deflected relative to the system housing during planar laser illumination and image detection operations and thus can be said to use "stationary" planar laser illumination beams to read relatively moving bar code symbol structures and other graphical indicia. The PLIIM system as shown in FIG. 2, i.e. those employing area-type (2-D) image detection arrays, each produce a planar laser illumination beam that is scanned (i.e. deflected) relative to the system housing during planar laser illumination and image detection operations and thus can be said to use "moving" planar laser illumination beams to read relatively stationary bar code symbol structures and other graphical indicia.

In each such system embodiment, it is preferred that each planar laser illumination beam is focused so that the minimum beam width thereof (e.g. 0.6 mm along its non-spreading direction, as shown in FIG. 1E2) occurs at a point or plane which is the farthest or maximum working (i.e. object) distance at which the system is designed to acquire images of objects (Far Field), as best shown in FIG. 1E2. Hereinafter, this aspect of the present invention shall be deemed the "Focus Beam At Farthest Object Distance (FBAFOD)" principle.

In the case where a fixed focal length imaging subsystem is employed in the PLIIM system, the FBAFOD principle helps compensate for decreases in the power density of the incident planar laser illumination beam due to the fact that the width of the planar laser illumination beam increases in length for increasing object distances away from the imaging subsystem.

In the case where a variable focal length (i.e. zoom) imaging subsystem is employed in the PLIIM system, the FBAFOD principle helps compensate for (i) decreases in the power density of the incident planar illumination beam due to the fact that the width of the planar laser illumination beam increases in length for increasing object distances away from the imaging subsystem, and (ii) any $1/r^2$ type losses that would typically occur when using the planar laser planar illumination beam of the present invention.

By virtue of the present invention, scanned objects need only be illuminated along a single plane which is coplanar with a planar section of the field of view of the image formation and detection module (e.g. camera) during illumination and imaging operations carried out by the PLIIM system. This enables the use of low-power, light-weight, high-response, ultra-compact, high-efficiency solid-state illumination producing devices, such as visible laser diodes (VLDs), to selectively illuminate ultra-narrow sections of an object during image formation and detection operations, in contrast with high-power, low-response, heavy-weight, bulky, low-efficiency lighting equipment (e.g. sodium vapor lights) required by prior art illumination and image detection systems. In addition, the planar laser illumination techniques of the present invention enables high-speed modulation of the planar laser illumination beam, and use of simple (i.e. substantially-monochromatic wavelength) lens designs for substantially-monochromatic optical illumination and image formation and detection operations.

As was previously disclosed in co-pending patent application Ser. No. 10/639,362, PLIIM systems embodying the "planar laser illumination" and "FBAFOD" principles of the present invention can be embodied within a wide variety of bar code symbol reading and scanning systems, as well as optical character, text, and image recognition systems well known in the art.

In general, bar code symbol reading systems can be grouped into at least two general scanner categories, namely: industrial scanners; and point-of-sale (POS) scanners.

An industrial scanner is a scanner that has been designed for use in a warehouse or shipping application where large numbers of packages must be scanned in rapid succession. Industrial scanners include conveyor-type scanners, and hold-under scanners. These scanner categories will be described in greater detail below.

Conveyor scanners are designed to scan packages as they move by on a conveyor belt. In general, a minimum of six conveyors (e.g. one overhead scanner, four side scanners, and one bottom scanner) are necessary to obtain complete coverage of the conveyor belt and ensure that any label will be scanned no matter where on a package it appears. Conveyor scanners can be further grouped into top, side, and bottom scanners which will be briefly summarized below.

Top scanners are mounted above the conveyor belt and look down at the tops of packages transported there along. It might be desirable to angle the scanner's field of view slightly in the direction from which the packages approach or that in which they recede depending on the shapes of the packages being scanned. A top scanner generally has less severe depth of field and variable focus or dynamic focus requirements compared to a side scanner as the tops of packages are usually fairly flat, at least compared to the extreme angles that a side scanner might have to encounter during scanning operations.

Side scanners are mounted beside the conveyor belt and scan the sides of packages transported there along. It might be desirable to angle the scanner's field of view slightly in the direction from which the packages approach or that in which they recede depending on the shapes of the packages being scanned and the range of angles at which the packages might be rotated.

Side scanners generally have more severe depth of field and variable focus or dynamic focus requirements compared to a top scanner because of the great range of angles at which the sides of the packages may be oriented with respect to the scanner (this assumes that the packages can have random rotational orientations; if an apparatus upstream on the on the conveyor forces the packages into consistent orientations, the difficulty of the side scanning task is lessened). Because side scanners can accommodate greater variation in object distance over the surface of a single target object, side scanners can be mounted in the usual position of a top scanner for applications in which package tops are severely angled.

Bottom scanners are mounted beneath the conveyor and scan the bottoms of packages by looking up through a break in the belt that is covered by glass to keep dirt off the scanner. Bottom scanners generally do not have to be variably or dynamically focused because its working distance is roughly constant, assuming that the packages are intended to be in contact with the conveyor belt under normal operating conditions. However, boxes tend to bounce around as they travel on the belt, and this behavior can be amplified when a package crosses the break, where one belt section ends and another begins after a gap of several inches. For this reason, bottom scanners must have a large depth of field to accommodate these random motions, to which a variable or dynamic focus system could not react quickly enough.

Hold-under scanners are designed to scan packages that are picked up and held underneath it. The package is then manually routed or otherwise handled, perhaps based on the result of the scanning operation. Hold-under scanners are generally mounted so that its viewing optics is oriented in a downward direction, like a library bar code scanner. Depth of field (DOF) is an important characteristic for hold-under scanners, because the operator will not be able to hold the package perfectly still while the image is being acquired.

Point-of-sale (POS) scanners are typically designed to be used at a retail establishment to determine the price of an item being purchased. POS scanners are generally smaller than industrial scanner models, with more artistic and ergonomic case designs. Small size, low weight, resistance to damage from accident drops and user comfort are all major design factors for POS scanner. POS scanners include hand-held scanners, hands-free presentation scanners and combination-type scanners supporting both hands-on and hands-free modes of operation. These scanner categories will be described in greater detail below.

Hand-held scanners are designed to be picked up by the operator and aimed at the label to be scanned.

Hands-free presentation scanners are designed to remain stationary and have the item to be scanned picked up and passed in front of the scanning device. Presentation scanners can be mounted on counters looking horizontally, embedded flush with the counter looking vertically, or partially embedded in the counter looking vertically, but having a "tower" portion which rises out above the counter and looks horizontally to accomplish multiple-sided scanning. If necessary, presentation scanners that are mounted in a counter surface can also include a scale to measure weights of items.

Some POS scanners can be used as handheld units or mounted in stands to serve as presentation scanners, depending on which is more convenient for the operator based on the item that must be scanned.

Generalized embodiments of the PLIIM system of the present invention will be described below. Various alternative embodiments of the PLIIM system were previously disclosed in co-pending patent application Ser. No. 10/639,362, incorporated herein by reference in it's entirely.

2. First Generalized Embodiment of the PLIIM System of the Present Invention:

A first generalized embodiment of the PLIIM system of the present invention 1 is illustrated in FIG. 1A1. As shown therein, the PLIIM system 1 comprises: a housing 2 of compact construction; a linear (i.e. 1-dimensional) type IFDM 3 including a 1-D electronic image detection array 3A, and a linear (1-D) imaging subsystem (LIS) 3B having a fixed focal length, a fixed focal distance, and a fixed field of view (FOV), for forming a 1-D image of an illuminated object 4 located within the fixed focal distance and FOV thereof and projected onto the 1-D image detection array 3A, so that the 1-D image detection array 3A can electronically detect the image formed thereon and automatically produce a digital image data set 5 representative of the detected image for subsequent image processing; and a pair of planar laser illumination arrays (PLIAs) 6A and 6B, each mounted on opposite sides of IFDM 3, such that each planar laser illumination array 6A and 6B produces a plane of laser beam illumination 7A, 7B which is disposed substantially coplanar with the field view of the IFDM 3 during object illumination and image detection operations carried out by the PLIIM system.

An IFDM 3 having an imaging lens with a fixed focal length has a constant angular field of view (FOV); that is, the imaging subsystem can view more of the target object's surface as the target object is moved further away from the IFDM 3. A major disadvantage to this type of imaging lens is that the resolution of the image that is acquired, expressed in terms of pixels or dots per inch (dpi), varies as a function of the distance from the target object to the imaging lens. However, a fixed focal length imaging lens is easier and less expensive to design and produce than a zoom-type imaging lens.

Referring to FIGS. 1A1 and 1A2, the distance from the imaging lens 3B to the image detecting (i.e. sensing) array 3A is referred to as the image distance. The distance from the target object 4 to the imaging lens 3B is called the object distance. The relationship between the object distance (where the object resides) and the image distance (at which the image detection array is mounted) is a function of the characteristics of the imaging lens, and assuming a thin lens, is determined by the thin (imaging) lens equation defined in co-pending patent application Ser. No. 10/629,362 in great detail.

In accordance with the present invention, the planar laser illumination arrays 6A and 6B, the linear image formation and detection module 3, and any non-moving FOV and/or planar laser illumination beam folding mirrors employed in any particular system configuration described herein, are fixedly mounted on an optical bench 8 or chassis so as to prevent any relative motion (which might be caused by vibration or temperature changes) between: (i) the image forming optics (e.g. imaging lens) within the image formation and detection module 3 and any stationary FOV folding mirrors employed therewith; and (ii) each planar laser illumination array (i.e. VLD/cylindrical lens assembly) 6A, 6B and any planar laser illumination beam folding mirrors employed in the PLIIM system configuration. Preferably, the chassis assembly should provide for easy and secure alignment of all optical components employed in the planar laser illumination arrays 6A and 6B as well as the image formation and detection module 3, as well as be easy to manufacture, service and repair. Also, this PLIIM system 1 employs the general "planar laser illumination" and "focus beam at farthest object distance (FBAFOD)" principles described above.

3. Detailed Description of the Planar Laser Illumination Modules (PLIMs) Employed in the Planar Laser Illumination Arrays (PLIAs) of the Illustrative Embodiments:

Referring now to FIGS. 1B3 through 1E2, the construction of each PLIM 14 and 15 used in the planar laser illumination arrays (PLIAs) will now be described in greater detail below.

As shown in FIG. 1B3, each PLIA 6A, 6B employed in the PLIIM system of FIG. 1B1, comprises an array of PLIMs 11 adjustably mounted on the L-bracket structure 32, as described hereinabove. As shown in FIGS. 1B4 through 1C1, each PLIM of the embodiment disclosed herein comprises an assembly of subcomponents: a VLD mounting block 14 having a tubular geometry with a hollow central bore 14A formed entirely there through, and a v-shaped notch 14B formed on one end thereof; a visible laser diode (VLD) 13 (e.g. Mitsubishi ML1XX6 Series high-power 658 nm AlGaInP semiconductor laser) axially mounted at the end of the VLD mounting block, opposite the v-shaped notch 14B, so that the laser beam produced from the VLD 13 is aligned substantially along the central axis of the central bore 14A; a cylindrical lens 16, made of optical glass (e.g. borosilicate) or plastic having the optical characteristics specified, for example, in FIGS. 1B1 and 1B2, and fixedly mounted within the V-shaped notch 14B at the end of the VLD mounting block 14, using an optical cement or other lens fastening means, so that the central axis of the cylindrical lens 16 is oriented substantially perpendicular to the optical axis of the central bore 14A; and a focusing lens 15, made of central glass (e.g. borosilicate) or plastic having the optical characteristics shown, for example, in FIGS. 1D1 and 1D2, mounted within the central bore 14A of the VLD mounting block 14 so that the optical axis of the focusing lens 15 is substantially aligned with the central axis of the bore 14A, and located at a distance from the VLD which causes the laser beam output from the VLD 13 to be converging in the direction of the cylindrical lens 16. Notably, the function of the cylindrical lens 16 is to disperse (i.e. spread) the focused laser beam from focusing lens 15 along the plane in which the cylindrical lens 16 has curvature, as shown in FIG. 1E1 while the characteristics of the planar laser illumination beam (PLIB) in the direction transverse to the propagation plane are determined by the focal length of the focusing lens 15, as illustrated in FIGS. 1E1 and 1E2. As previously described in co-pending patent application Ser. No. 10/639, 362 in great detail, the focal length of the focusing lens 15 within each PLIM hereof is preferably selected so that the substantially planar laser illumination beam produced from the cylindrical lens 16 is focused at the farthest object distance in the field of view of the image formation and detection module 3, as shown in FIG. 1E2, in accordance with the "FBAFOD" principle of the present invention.

After specifying the optical components for each PLIM, and completing the assembly thereof, each PLIM is adjustably mounted to the L bracket position 32A by way of a set of mounting/adjustment screws turned through fine-threaded mounting holes formed thereon. In FIG. 1B5, the plurality of PLIMs 11A through 11F are shown adjustably mounted on the L-bracket at positions and angular orientations which ensure substantially uniform power density characteristics in both the near and far field portions of the planar laser illumination field produced by PLIAs 6A and 6B cooperating together in accordance with the principles of the present. Notably, the relative positions of the PLIMs indicated in FIG. 1B4 were determined for a particular set of a commercial VLDs 13 used in the illustrative embodiment of the present invention, and, as the output beam characteristics will vary for each commercial VLD used in constructing each such PLIM, it is therefore understood that each such PLIM may need to be mounted at different relative positions on the L-bracket of the planar laser illumination array to obtain, from the resulting system, substantially uniform power density characteristics at both near and far regions of the planar laser illumination field produced thereby.

While a refractive-type cylindrical lens element 16 has been shown mounted at the end of each PLIM of the generalized embodiments, it is understood each cylindrical lens element can be realized using refractive, reflective and/or diffractive technology and devices, including reflection and transmission type holographic optical elements (HOEs) well know in the art and described in detail in published International Application No. WO 99/57579 Nov. 11, 1999 [108-010PCT000], incorporated herein by reference. The only requirement of the optical element mounted at the end of each PLIM is that it has sufficient optical properties to convert a focusing laser beam transmitted there through, into a laser beam which expands or otherwise spreads out only along a single plane of propagation, while the laser beam is substantially unaltered (i.e. neither compressed or expanded) in the direction normal to the propagation plane. As used hereinafter and in the claims, the terms "cylindrical lens", "cylindrical lens element" and "cylindrical optical element (COE)" shall be deemed to embrace all such alternative embodiments of this aspect of the present invention.

4. Second Generalized Embodiment of the PLIIM System of the Present Invention:

The second generalized embodiment of the PLIIM system of the present invention 60 is illustrated in FIG. 2. As shown therein, the PLIIM system 60 comprises: a housing 2 of compact construction; an area (i.e. 2-dimensional) type IFDM 55 including a 2-D electronic image detection array 55A, and an area (2-D) imaging subsystem (LIS) 55B having a fixed focal length, a fixed focal distance, and a fixed field of view (FOV), for forming a 2-D image of an illuminated object located within the fixed focal distance and FOV thereof and projected onto the 2-D image detection array 55A, so that the 2-D image detection array 55A can electronically detect the image formed thereon and automatically produce a digital image data set 5 representative of the detected image for subsequent image processing; and a pair of PLIAs 6A and 6B, each mounted on opposite sides of the IFDM 55, for producing first and second planes of laser beam illumination 7A and 7B that are folded and swept so that the planar laser illumination beams are disposed substantially coplanar with a section of the FOV of IFDM 55 during object illumination and image detection operations carried out by the PLIIM system.

In accordance with the present invention, the PLIAs 6A and 6B, the linear IFDM 55, and any stationary FOV folding mirror employed in any configuration of this generalized system embodiment, are fixedly mounted on an optical bench or chassis so as to prevent any relative motion (which might be caused by vibration or temperature changes) between: (i) the image forming optics (e.g. imaging lens) within the image formation and detection module 55 and any stationary FOV folding mirror employed therewith; and (ii) each planar laser illumination module (i.e. VLD/cylindrical lens assembly) and each planar laser illumination beam folding/sweeping mirror employed in the PLIIM system configuration. Preferably, the chassis assembly should provide for easy and secure alignment of all optical components employed in the PLIAs 6A and 6B as well as the IFDM 55, as well as be easy to manufacture, service and repair. Also, this generalized PLIIM system embodiment employs the general "planar laser illumination" and "focus beam at farthest object distance (FBAFOD)" principles described above.

5. First Illustrative Embodiment of the PLIIM System of the Present Invention Employing Visible Laser Diode (VLD) Displacement:

A consideration when designing vision-based industrial bar code imagers is the equalization of the laser illumination from near field to far field, such that the image brightness is substantially independent of object distance. This can be accomplished, at least in part, by controlling the width of the laser line, in particular by causing the laser line to decrease in width from near field to far field. However, there may be situations in which controlling the laser line width is insufficient to achieve complete equalization of the laser line profiles. Referring to FIG. 4A1, an improved method of and system for equalizing the illumination produced by PLIAs 6A and 6B within a PLIIM system will be described in great detail below.

The method and system will be described with reference to two scenarios, namely: (1) if the near field laser line is brighter than the far field laser line (FIGS. 3A1 and 3B1) and (2) if the far field laser line is brighter than the near field laser line (FIGS. 3A3 and 3B3).

In the first scenario, referring to FIGS. 3A1-3A2 and 3B1-3B2, the near field laser line is brighter than the far field laser line (FIG. 3A1, plot 3), i.e. the near field image results in a brighter image than the far field image. In order to equalize the profile, the PLIMs are adjustably mounted to the L bracket in a staggered formation as shown in FIG. 4A2 by way of a set of mounting/adjustment screws turned through fine-threaded mounting holes formed thereon, such that their individual laser lines overlap precisely at the far limit of the camera's field of view (FIG. 3B2). Once positioned, the illumination begins as two partially overlapping composite lines in the near field, and these lines gradually merge into one line at the far field. In this manner, the far field receives the same (maximum) power density as in the case when all the laser lines precisely overlap everywhere. However, the power density incident on the near field is reduced, since centers of the individual laser lines, where the power density is greatest, no longer correspond to the center of the camera's FOV. Thus, the brightness of the near field image may be reduced to equal that of the far field image (FIG. 3A2, plot 6).

In the second scenario, referring to FIGS. 3A3-3A4 and 3B3-3B4, the far field laser line is brighter than the near field laser line (FIG. 3A3, plot 9), i.e. the far field image results in a brighter image than the near field image. In order to equalize the profile, the PLIMs are adjustably mounted to the L bracket in a staggered formation as shown in FIG. 4A2 by way of a set of mounting/adjustment screws turned through fine-threaded mounting holes formed thereon, such that their individual laser lines overlap precisely at the near limit of the camera's field of view (FIG. 3B4). Once positioned, the illumination begins as one line in the near field, and this line gradually diverges into two partially overlapping composite lines at the far field. In this manner, the near field receives the same (maximum) power density as in the case when all the laser lines precisely overlap everywhere. However, the power density incident on the far field is reduced, since centers of the individual laser lines, where the power density is greatest, no longer correspond to the center of the camera's FOV. Thus, the brightness of the far field image may be reduced to equal that of the near field image (FIG. 3A4, plot 12).

Preferably, the PLIMs are staggered so that a first portion of the laser sources are displaced and angled in one direction and a second portion of the laser sources are displaced and angled in the opposite and equal direction as shown in FIGS. 3B2 and 3B4.

6. Modifications of the First Illustrative Embodiment:

Conceivable, in an alternative embodiment, the PLIMs could be staggered so that all the laser sources are displaced and angled in the same direction as shown in FIGS. 3B5 and 3B6. FIG. 3B5 shows all the PLIMs displaced in the same direction and angled so the near field receives the maximum power density and the power density incident on the far field is reduced. FIG. 3B6 shows all the PLIMs displaced in the same direction and angled so the far field receives the maximum power density and the power density incident on the near field is reduced.

Conceivably, in another alternative embodiment, the PLIMs could be staggered so that a first portion of the laser sources are displaced in one direction and a second portion of the laser sources are displaced in the opposite direction, but in unequal numbers.

Conceivably, in another alternative embodiment, the PLIMs could be staggered so that a first portion of the laser sources are displaced in one direction and a second portion of the laser sources are displaced in the opposite direction, but by unequal distances.

It is understood that the systems, methods, modules, engines and subsystems of the illustrative embodiments may be modified in a variety of ways which will become readily apparent to those skilled in the art, and having the benefit of the novel teachings disclosed herein.

7. Modifications of the Generalized Embodiment:

While each embodiment of the PLIIM system of the present invention disclosed herein has employed a pair of PLIAs, it is understood that in other embodiments of the present invention, only a single PLIA may be used, whereas in other embodiments three or more PLIAs may be used depending on the application at hand.

While the illustrative embodiments disclosed herein have employed electronic-type imaging detectors (e.g. 1-D and 2-D CCD-type image sensing/detecting arrays) for the clear advantages that such devices provide in bar code and other photo-electronic scanning applications, it is understood, however, that photo-optical and/or photo-chemical image detectors/sensors (e.g. optical film) can be used to practice the principles of the present invention disclosed herein.

While the illustrative embodiment disclosed in FIG. 1A1 does not employ folding mirrors, conceivably, in another alternative embodiment as shown in FIG. 4A4, the PLIMs could be staggered to produce a first and second composite planar illumination beam, after which a folding mirror is provided so as to fold the optical paths of the first and second composite planar illumination beams such that the planes of the first and second composite planar laser illumination beams are in a direction that is coplanar with the field of view of the IFDM.

While the package conveyor subsystems employed in the illustrative embodiments have utilized belt or roller structures to transport packages, it is understood that this subsystem can be realized in many ways, for example: using trains running on tracks passing through the laser scanning tunnel; mobile transport units running through the scanning tunnel installed in a factory environment; robotically-controlled platforms or carriages supporting packages, parcels or other bar coded objects, moving through a laser scanning tunnel subsystem.

While the various embodiments of the package identification and measuring system hereof have been described in connection with linear (1-D) and 2-D code symbol scanning applications, it should be clear, that the system and methods of the present invention are equally suited for scanning alpha-numeric characters (e.g. textual information) in optical character recognition (OCR) applications, as taught in U.S. Pat. No. 5,727,081 to Burges, et al, incorporated herein by reference, and scanning graphical images as practiced in the graphical scanning arts.

It is understood that the laser scanning systems, modules, engines and subsystems of the illustrative embodiments may be modified in a variety of ways which will become readily apparent to those skilled in the art, and having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A method of equalizing the illumination produced by a planar laser illumination array within a planar laser illumination and electronic imaging system, comprising the steps of:
    providing an image formation and detection module having imaging optics with a field of view (FOV) focused upon an image detecting array;
    providing a planar laser illumination array having a plurality of planar laser illumination modules, each planar laser illumination module producing a planar laser beam component during image formation and detection operations, which are combined to produce a composite planar laser illumination beam extending through a working range of said FOV, wherein said working range includes both near and far fields,
    if the near field illumination is brighter than the far field illumination:
        displacing a first portion of the planar illumination modules in a first direction perpendicular to said FOV and a second portion of the planar illumination modules in a second direction opposite to said first direction, angling each planar laser illumination beam component to overlap at said far field, whereby the power density incident on the near field is reduced; and
    if the far field illumination is brighter than the near field illumination:
        displacing a first portion of the planar illumination modules in a first direction perpendicular to the FOV and a second portion of the planar illumination modules in a second direction opposite to said first direction, angling each planar laser illumination beam component to overlap at the near field, whereby the power density incident on the far field is reduced.

2. The method of claim 1, wherein each of said plurality of planar laser illumination modules comprises a visible laser diode (VLD), a focusing lens, and a cylindrical optical element arranged therewith to produce one of said plurality of substantially planar laser illumination beam components.

3. The method of claim 1, wherein said image formation and detection module and said planar laser illumination array are both contained in a system housing.

4. The method of claim 3, which comprises supporting said system housing above a conveyor belt structure along which the object is transported.

5. The method of claim 1, wherein said first portion of the planar illumination modules are equal in number to said second portion of the planar illumination modules.

6. The method of claim 1, wherein said first portion of the planar illumination modules are not equal in number to said second portion of the planar illumination modules.

7. A method of equalizing the illumination produced by a planar laser illumination array within a planar laser illumination and electronic imaging system, comprising the steps of:
    providing an image formation and detection module having imaging optics with a field of view (FOV) focused upon an image detecting array;
    providing a planar laser illumination array having a plurality of planar laser illumination modules, each planar laser illumination module producing a planar laser beam component during image formation and detection operations, which are combined to produce a composite planar laser illumination beam extending through a working range of said FOV, wherein said working range includes both near and far fields, in response to the near field illumination being brighter than the far field illumination:
  displacing a first portion of the planar illumination modules in a first direction perpendicular to said FOV and a second portion of the planar illumination modules in a second direction opposite to said first direction, aligning each planar laser illumination beam component to overlap at said far field, whereby the power density incident on the near field is reduced; and in response to the far field illumination being brighter than the near field illumination:
  displacing a first portion of the planar illumination modules in a first direction perpendicular to the FOV and a second portion of the planar illumination modules in a second direction opposite to said first direction, aligning each planar laser illumination beam component to overlap at the near field, whereby the power density incident on the far field is reduced.

8. The method of claim 7, wherein each of said plurality of planar laser illumination modules comprises a visible laser diode (VLD), a focusing lens, and a cylindrical optical element arranged therewith to produce one of said plurality of substantially planar laser illumination beam components.

9. The method of claim 7, wherein said image formation and detection module and said planar laser illumination array are both contained in a system housing.

10. The method of claim 9, which comprises supporting said system housing above a conveyor belt structure along which the object is transported.

11. The method of claim 7, wherein said first portion of the planar illumination modules are equal in number to said second portion of the planar illumination modules.

12. The method of claim 7, wherein said first portion of the planar illumination modules are not equal in number to said second portion of the planar illumination modules.

13. A planar laser illumination and electronic imaging system, said system comprising:

an image formation and detection module having imaging optics with a field of view (FOV) focused upon an image detecting array;
  a planar laser illumination array having a plurality of planar laser illumination modules, each planar laser illumination module producing a planar laser beam component during image formation and detection operations, which are combined to produce a composite planar laser illumination beam extending through a working range of said FOV, wherein said working range includes both near and far fields,
  means for equalizing the illumination profile produced by said planar illumination array, if said near field illumination is brighter than said far field illumination, by aligning each planar laser illumination beam component to overlap at said far field, whereby the power density incident on the near field is reduced; and
  means for equalizing the illumination profile produced by said planar illumination array, if said far field illumination is brighter than said near field illumination, by aligning each planar laser illumination beam component to overlap at the near field, whereby the power density incident on the far field is reduced.

14. The system of claim 13, wherein each of said plurality of planar laser illumination modules comprises a visible laser diode (VLD), a focusing lens, and a cylindrical optical element arranged therewith to produce one of said plurality of substantially planar laser illumination beam components.

15. The system of claim 13, wherein said image formation and detection module and said planar laser illumination array are both contained in a system housing.

16. The system of claim 15, which comprises supporting said system housing above a conveyor belt structure along which the object is transported.

17. The system of claim 13, wherein said first portion of the planar illumination modules are equal in number to said second portion of the planar illumination modules.

18. The system of claim 13, wherein said first portion of the planar illumination modules are not equal in number to said second portion of the planar illumination modules.

* * * * *